US010560595B2

(12) United States Patent
Messner et al.

(10) Patent No.: US 10,560,595 B2
(45) Date of Patent: Feb. 11, 2020

(54) DEVICE AND METHOD FOR DEFLECTING A BEAM OF LIGHT

(71) Applicant: Robert Bosch GmbH, Stuttgart (DE)

(72) Inventors: Dominik Messner, Schoemberg (DE); Mohamad Iyad Al Dibs, Pliezhausen (DE)

(73) Assignee: Robert Bosch GmbH, Stuttgart (DE)

( * ) Notice: Subject to any disclaimer, the term of this patent is extended or adjusted under 35 U.S.C. 154(b) by 72 days.

(21) Appl. No.: 15/773,464

(22) PCT Filed: Nov. 2, 2016

(86) PCT No.: PCT/EP2016/076335
§ 371 (c)(1),
(2) Date: May 3, 2018

(87) PCT Pub. No.: WO2017/084873
PCT Pub. Date: May 26, 2017

(65) Prior Publication Data
US 2018/0324318 A1    Nov. 8, 2018

(30) Foreign Application Priority Data

Nov. 16, 2015 (DE) .................. 10 2015 222 523

(51) Int. Cl.
*H04N 1/053*        (2006.01)
*H04N 1/028*        (2006.01)
(Continued)

(52) U.S. Cl.
CPC ....... *H04N 1/0283* (2013.01); *H04N 1/00997* (2013.01); *H04N 1/04* (2013.01); *H04N 1/053* (2013.01)

(58) Field of Classification Search
CPC ....... H04N 1/047; H04N 1/0473; H04N 1/053
See application file for complete search history.

(56) References Cited

U.S. PATENT DOCUMENTS

2007/0058234 A1    3/2007    Oettinger et al.
2007/0177241 A1    8/2007    Keh et al.
(Continued)

FOREIGN PATENT DOCUMENTS

CN    101156102 A    4/2008
EP    1275998 A1    1/2003
(Continued)

OTHER PUBLICATIONS

International Search Report dated Jan. 1, 2017, of the corresponding International Application PCT/EP2016/076335 filed Nov. 2, 2016.

*Primary Examiner* — Thanh Luu
(74) *Attorney, Agent, or Firm* — Norton Rose Fulbright US LLP; Gerard A. Messina

(57) ABSTRACT

A device and a method for deflecting a beam of light. The device is developed together with: an adjustable deflection device; a closed-loop control unit, which is designed to generate an actuating signal by which the deflection device is controlled in a periodic movement for scanning a solid angle region with the aid of a beam of light deflected by the deflection device; and a detector device, which is designed to detect an impingement or a missing impingement of the scanning beam of light on the detector device, and to generate a measuring signal based thereon; the closed-loop control unit furthermore being designed to adapt the actuating signal based on at least the measuring signal.

8 Claims, 6 Drawing Sheets

(51) Int. Cl.
*H04N 1/04* (2006.01)
*H04N 1/00* (2006.01)

(56) References Cited

U.S. PATENT DOCUMENTS

| | | | |
|---|---|---|---|
| 2007/0222953 A1* | 9/2007 | Bock | G02B 26/101 |
| | | | 353/98 |
| 2009/0316243 A1 | 12/2009 | Tsuida | |
| 2010/0079836 A1 | 4/2010 | Rothaar | |

FOREIGN PATENT DOCUMENTS

| | | |
|---|---|---|
| JP | 2003131151 A | 5/2003 |
| JP | 2004258548 A | 9/2004 |
| JP | 2005181831 A | 7/2005 |
| JP | 2011180294 A | 9/2011 |
| JP | 2011237666 A | 11/2011 |
| WO | 2008032485 A1 | 3/2008 |
| WO | 2011065219 A1 | 6/2011 |

\* cited by examiner

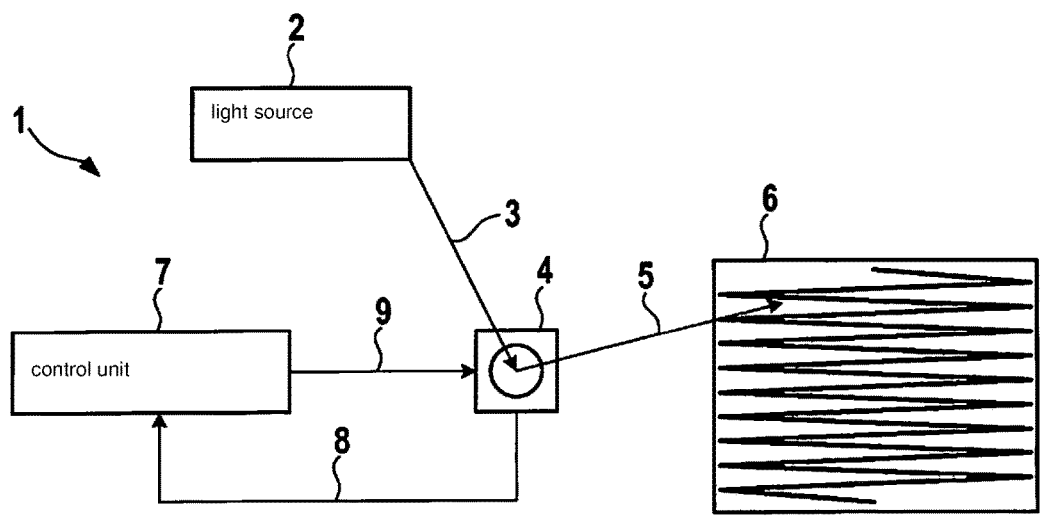
Fig. 7 (conventional)

DEVICE AND METHOD FOR DEFLECTING A BEAM OF LIGHT

FIELD

The present invention relates to a device and to a method for deflecting a beam of light, in particular to a device and a method for the controlled deflection of a laser beam with the aid of a micromirror.

BACKGROUND INFORMATION

Laser scanners are used for a multitude of applications such as an image projection, in headlights, or for scanning the environments of vehicles. A laser scanner particularly is a device by which a laser beam is directed to a deflection device, which controls the laser beam according to an actuating signal in such a way that the reflected laser beam scans a particular solid angle region, e.g., a screen. Scanning here refers to a traversing scanning of the solid angle region or the screen, e.g., using a zigzag pattern. The desired scanning density may depend on the respective application.

U.S. Patent App. Pub. No. 2010/079 836 A1 exemplarily describes a laser scanner as it will be elucidated in greater detail in the following text with the aid of FIG. 7. FIG. 7 shows a conventional laser scanner 1, which has a light source 2 that is designed to generate a laser beam 3 and to guide it onto a deflection device 4. Laser beam 3 impinging on deflection device 4 is deflected as deflected laser beam 5 in the direction of screen 6, and a closed-loop control unit 7 controls deflection device 4 in order to scan screen 6.

Towards this end, deflection device 4 rotates about a first axis of rotation, which may also be referred to as a fast axis of rotation, so that screen 6 is periodically traversed in the horizontal direction from left to right and back again. In addition, deflection device 4 rotates about a second axis of rotation, which may also be called the slow axis of rotation, such that laser beam 5 periodically traverses screen 6 from top to bottom and back again. Superposing the movements about the first and the second, i.e., the fast and the slow, axis of rotation results in the zigzag pattern shown on screen 6 in FIG. 7. Closed-loop control unit 7 receives position signals 8, which indicate a respective position of deflection device 4, and adapts control signals 9 for the control of deflection device 4 on the basis thereof. Conventional methods for sensing the current position of deflection device 4 function according to the electrostatic, piezo-resistive or electromagnetic principle, for instance.

SUMMARY

In accordance with the present invention, an example device is provided for deflecting a beam of light, the device includes an adjustable deflection device; a closed-loop control unit, which is designed to generate an actuating signal by which the deflection device is controlled in a periodic movement for scanning a solid angle region or an object with the aid of a beam of light that is deflected by the deflection device; a detector device, which is designed to detect, in particular periodically, an impinging or a missing impinging of the scanning beam of light on the detector device and to generate a measuring signal on the basis thereof; the closed-loop control unit furthermore is designed to adapt the actuating signal on the basis of the measuring signal.

The beam of light that impinges on the deflection device may be provided by a supply unit of the device, e.g., by a light source or a device for coupling an externally generated beam of light into the device. The beam of light may be a laser beam, in particular.

A deflection device is to be particularly understood as a micromirror, i.e., a micromechanical, adjustable reflective surface, together with a corresponding actuator system for the adjustment, i.e., for the controlled deflection of the reflective surface for the selective deflection of a beam of light. The scanning of the solid angle region may be employed for scanning a screen, for instance, and can be carried out as described earlier in connection with the related art and FIG. 7. In particular, the scanning may include a fast movement, e.g., horizontally, according to a fast axis of rotation of the micromirror, and a slow movement, e.g., a horizontal movement, according to a slow axis of rotation of the micromirror, which are superposed to each other, the fast movement being faster than the slow movement. A periodic movement is to be understood both as a continual movement in an always identical direction of rotation, e.g., as in a rotating micromirror, and as a periodic back and forth movement, e.g., as in a resonantly operated micromirror. The deflection of light by the deflection device may also entirely or partially take place by a deformation of the reflective surface.

In addition, a method is provided for deflecting a beam of light, said method including the steps: Controlling a deflection device with the aid of a control signal for scanning a solid angle region or an object with the aid of a beam of light, which is deflected by a deflection device in a periodic movement; detecting, in particular periodically, an impinging or missing impinging of the scanning beam of light on a detector device; generating a measuring signal based on a result of the detection; and adapting the actuating signal on the basis of the measuring signal.

The present invention provides a device and a method for deflecting a beam of light, in which the use of the conventional position-sensor system for determining the instantaneous position, i.e., the alignment, of the deflection device is no longer necessary.

More specifically, the measuring signal, which indicates the impinging or the missing impinging of the scanning beam of light, is developed using one bit; for example, a logical value of one indicates an impingement of the beam of light, and a logical value of zero indicates a missing impingement of the beam of light. This makes it possible to reduce a required data quantity for controlling the deflection of the light, especially in comparison with a conventional position-sensor system, which has position information of 10 bits or more, for instance. Nevertheless, due to the known development and fixed position of the detector device, especially of the light detectors of the detector device, the 1-bit signal makes it possible to infer the precise position of the deflection device.

The present invention thus reduces a required circuit expenditure for the sensing and evaluation in a laser scanner, for example. In addition, a cost-intensive thermo-calibration of a conventional position-sensor system is able to be avoided. Moreover, ageing effects of the deflection device, for example, are able to be determined more precisely and compensated for without this becoming more difficult by ageing effects of conventional position-sensor systems. Ageing effects, for example, include a drift in the offset or a diminishing sensitivity. In addition, a thermal offset and thermal sensitivity errors are reduced by a spatial separation of the detector device and the deflection device, which is continually heated by the impinging beam of light.

The present invention increases the availability and reliability of devices and methods for deflecting light. Due to the implicit position detection with the aid of the detector device in accordance with the present invention, a high degree of independence is created in comparison with the conventional position-sensor system. This, for example, may be combined with a conventional position-sensor system, thereby allowing for greater redundancy and/or plausibilization.

Advantageous specific embodiments and further developments are described herein with reference to the figures.

According to one preferred further development, the detector device is designed to detect the impingement or the missing impingement of the scanning beam of light on the detector device in each period of a periodic movement about a fast axis of rotation of the scanning of the solid angle region, and to do so at least once, preferably at least twice, and most specifically, exactly twice. A required data quantity may therefore be kept low and a precise detection of the periodic movement of the deflection device may take place at the same time. Since the movement about the fast axis of rotation of the scanning takes place more rapidly than a periodic movement about a slow axis of rotation of the scanning, one period of the periodic movement about the slow axis of rotation includes a multitude of periods of the periodic movement about the fast axis of rotation. It is therefore also possible to precisely detect the period of the periodic movement about the slow axis of rotation, especially if a deflection device for deflecting the beam of light is identical with regard to the fast axis of rotation, or if it is coupled in a fixed movement relation with a deflection device for deflecting the beam of light with regard to the slow axis of rotation.

According to another preferred further development, the detector device has a first light detector and a second light detector, which are designed to detect the impingement or the missing impingement of the scanning beam of light on the first and the second light detectors, and to do so once in each period of the periodic movement about the fast axis of rotation of the scanning of the solid angle region. As described earlier, the detecting may result in the generation of the measuring signal using a single bit. A light detector may be understood as any device that is capable of detecting light impinging on the light detector. For example, the light detector may be an optical detector such as a photo diode. Alternatively, the light detector may also be based on other physical effects in the impinging of the beam of light on the light detector, e.g., on heating. It is also possible to use more than two light detectors, which can be disposed in one or multiple row(s). As a result, multiple measuring points, and thus greater robustness of the control, are achievable.

According to another preferred further development, the deflection device is designed for a resonant operation; in other words, it is operated in a resonant manner. The actuating signal, which is adapted based on the measuring signal, may be developed in such a way that an amplitude of the periodic movement, especially an amplitude of the periodic movement about the fast axis of rotation of the scanning, is increased or decreased by the deflection device, especially by an actuator of the deflection device, based on the measuring signal.

According to another preferred further development, the closed-loop control unit is designed to use the adapted actuating signal in order to increase or decrease the amplitude of the periodic movement, in particular the periodic movement about the fast axis of rotation, especially at regular, consecutive measuring instants. The amplitude is increased if the detector device detects a missing impingement of the scanning beam of light on the detector device, and the amplitude is decreased if the detector device detects a missing impingement of the beam of light on the detector device. This makes it possible to control the amplitude of the deflection device in a particularly precise manner.

According to another preferred further development, the deflection device is designed for a quasi-static operation, or in other words, is operated in a quasi-static operation. For example, the detector device may have a first light detector and a second light detector, as described earlier in the text. The first light detector is designed to detect the impingement or the missing impingement of the scanning beam of light at a location that corresponds to a maximum positive deflection of the deflection device, and to do so exactly once in each period of the periodic movement about the fast axis of rotation of the scanning of the solid angle region. The second light detector is designed to detect the impingement or the missing impingement of the scanning beam of light at a location that corresponds to a maximum negative deflection of the deflection device and to do so exactly once in each period of the periodic movement about the fast axis of rotation of the scanning of the solid angle region. The first and the second light detectors may advantageously be disposed at a respective reversal point of the periodic movement about the fast axis of rotation of the scanning or in the vicinity of the respective reversal point.

According to another preferred further development, the closed-loop control unit is controllable by an external reference variable in order to generate the actuating signal. The device may have an interpolation device, which is designed to detect a first value of the reference variable at the instant when the scanning beam of light impinges on the first light detector, and to detect a second value of the reference variable at the instant when the scanning beam of light impinges on the second light detector. The interpolation device is furthermore designed to interpolate additional values of the reference variable between the detected first and second values of the reference variable. The reference variable for the control of the closed-loop control unit is adapted based on the interpolated additional values of the reference variable.

According to one preferred further development of the method according to the present invention, an amplitude of the periodic movement of the deflection device, in particular the periodic movement about the fast axis of rotation, is increased whenever the detector device detects a missing impingement of the scanning beam of light on the detector device at one of a multitude of measuring instants, in particular at regular, consecutive measuring instants. In addition, the amplitude of the periodic movement of the deflection device is decreased whenever the detector device detects an impingement of the scanning beam of light on the detector device at one of the multitude of measuring instants, especially regular, consecutive measuring instants. This allows for advantageous toggling of the actuating signal and the amplitude of the deflection device, in particular of a micromirror of the deflection device, at a particularly small time constant. The toggling may also be called "dithering" or "jittering" and denotes a back and forth jumping or switching of a signal value. Precise knowledge of the amplitude makes it possible to calculate precise zero crossings, for example. Zero crossings are frequently used for the synchronization with systems that are connected upstream or downstream from the device, e.g., for an image projection, laser drivers, a phase-locked loop, for an instant of an energy injection and similar things.

When referring to the periodic movement about the fast axis of rotation in the previous or the following text, then this invariably means that the respective provided modification or further development may additionally or alternatively also be applied to the periodic movement about the slow axis of rotation.

According to another preferred further development, the control of the deflection device in the method according to the present invention takes place as a function of an external reference variable; in the process, a first value of the reference variable is detected at the instant when the scanning beam of light impinges on a first light detector, and a second value of the reference variable is detected at the instant when the scanning beam of light impinges on a second light detector. Additional values of the reference variable are interpolated between the detected first and second values of the reference variable, and the reference variable is adapted based on the interpolated further values of the reference variable.

BRIEF DESCRIPTION OF THE DRAWINGS

Below, the present invention is described in greater detail on the basis of the exemplary embodiments shown in the figures.

FIG. 7 shows a schematized illustration of a conventional laser scanner.

DETAILED DESCRIPTION OF EXAMPLE EMBODIMENTS

Figure 1:
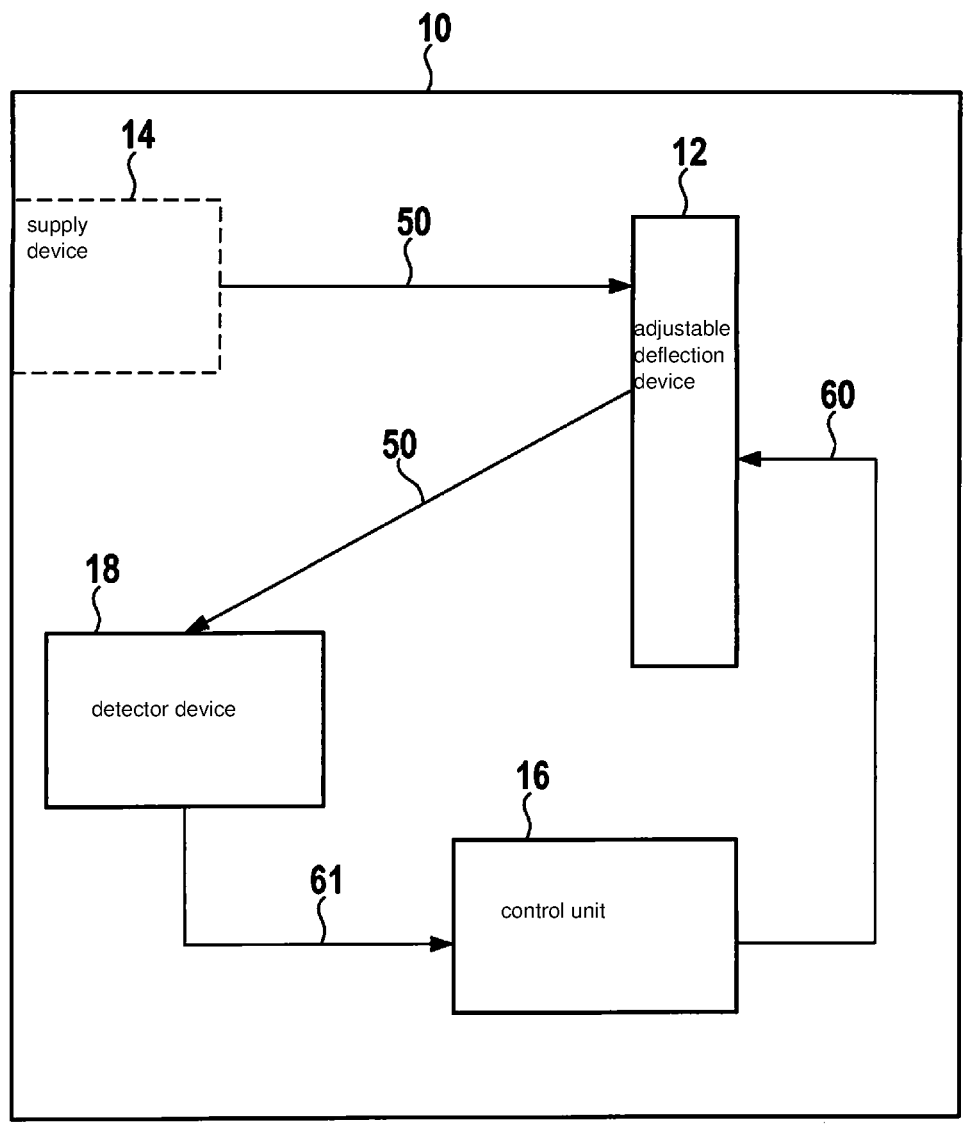
FIG. 1 shows a schematized illustration in order to describe a device for deflecting a beam of light according to one specific embodiment of the present invention.

Unless otherwise stated, identical or functionally equivalent elements and devices in all of the figures have been provided with the same reference numerals. The numbering of method steps was provided for reasons of clarity and, unless otherwise stated, is specifically not meant to imply a particular sequence in time. In particular, multiple method steps are also able to be carried out simultaneously.

FIG. 1 shows a schematized illustration in order to describe a device 10 for deflecting a beam of light 50 according to one specific embodiment of the present invention.

Device 10 includes an adjustable deflection device 12, which is operated, in particular in a resonant or quasi-static manner, by an actuating signal 60 in order to deflect a supplied beam of light 50, especially a laser beam, into a desired spatial direction or a desired solid angle. Device 10 may include a supply device 14 for this purpose, which is designed to supply a beam of light 50 and to guide it onto adjustable deflection device 12, e.g., a light source or a device for coupling an externally generated beam of light 50, especially a laser beam, into device 10. For example, supply device 14 may include a number of optical elements for this purpose, such as lenses, diaphragms, fiber optics lines and the like. Alternatively, by placing device 10 according to the present invention relative to an external light source, it is also possible to guide an externally generated beam of light as beam of light 50 onto deflection device 12.

Supplied beam of light 50 impinges on deflection device 12, by which it is deflected according to an instantaneous position, i.e., orientation, of deflection device 12. Device 12 additionally includes a detector device 18, which is designed to detect, especially periodically, an impingement or a missing impingement of scanning beam of light 50 on detector device 18, and then to generate a measuring signal 61 on that basis. A closed-loop control unit 16 of the device is designed to adapt actuating signal 60 based at least on measuring signal 61. The adaptation particularly takes place in order to compensate for an excessively large or insufficiently large amplitude of deflection device 12 or of deflected beam of light 50.

Figure 2:
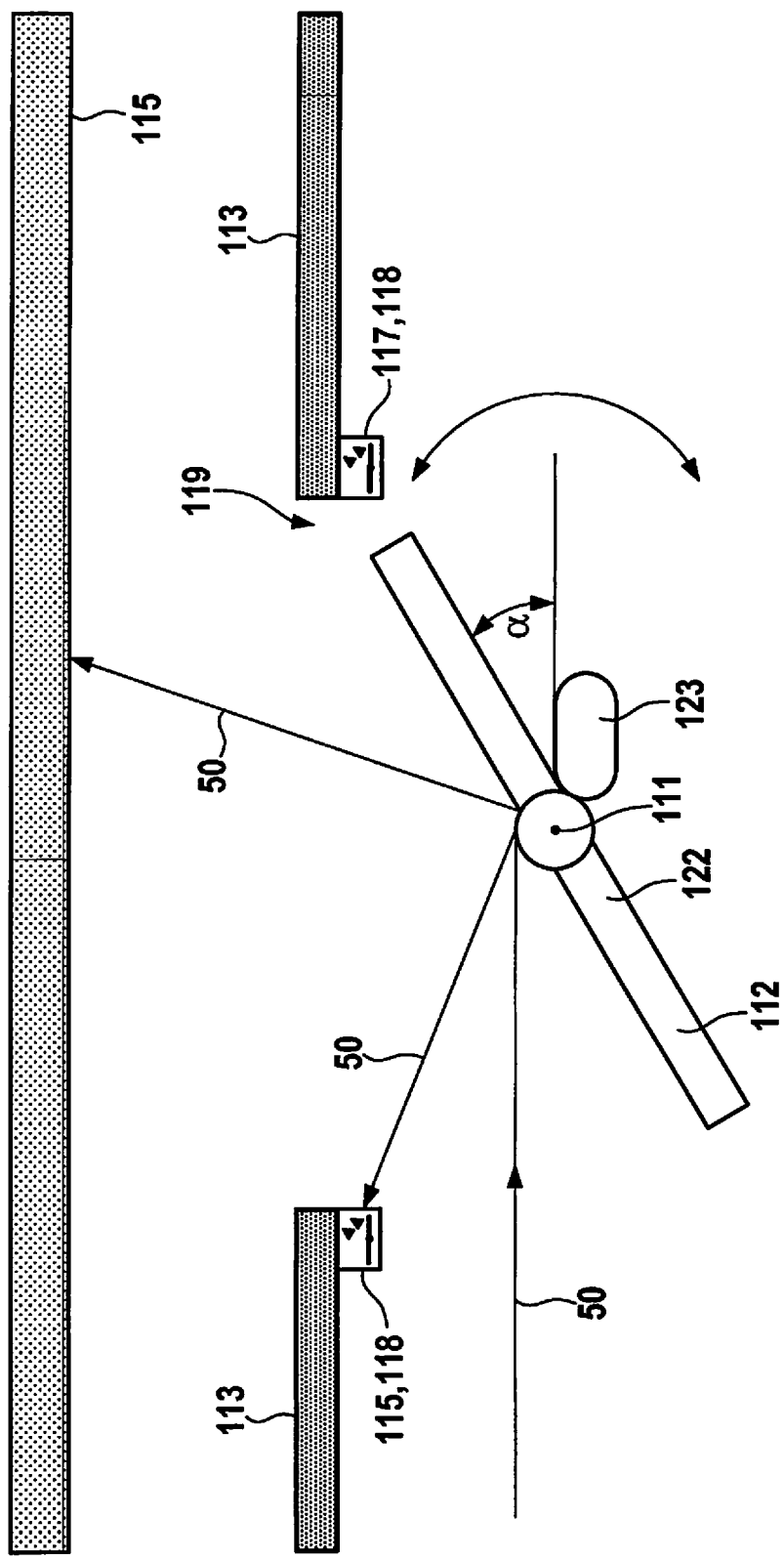
FIG. 2 shows a schematized illustration in order to describe a device for deflecting a beam of light according to a further specific embodiment of the present invention.

FIG. 2 shows a schematized representation in order to elucidate a device 110 for deflecting a beam of light 50 according to one further specific embodiment of the present invention. For the further description of device 110, reference is also made to FIG. 3, which shows a schematic block diagram of device 110.

Device 110 includes an adjustable deflection device 112, which has a micromirror 122 that is rotatable about an axis of rotation 111. An actuator device for rotating micromirror 122 is not explicitly shown in FIG. 2. For example, micromirror 122 may be fastened to a torsion spring. In FIG. 2, deflection device 112 is shown as deflected by an exemplary angle α. Device 110 may include a supply device 14 as described above with reference to FIG. 1, or it may be designed to receive an externally generated beam of light 50, in particular a laser beam. Supplied beam of light 50 impinges on deflection device 112, where it is deflected as a function of instantaneous deflection angle α. In addition, FIG. 2 shows an optional diaphragm 113 having an opening 119 through which beam of light 50, which is deflected by deflection device 112, must pass in order to reach a solid angle region 115 or an object to be scanned.

In FIG. 2 and the exemplary embodiment described there by way of example, axis of rotation 111 of deflection device 112 is a single axis of rotation or a fast axis of rotation of micromirror 122. Because of the fast axis of rotation, a horizontal deflection of beam of light 50, for example, is able to be achieved. Using a further adjustable deflection device (not shown), a vertical deflection, generally a deflection in a direction perpendicular to the deflection direction according to the fast axis of deflection, for example, may be achieved. Optionally, device 110 may include an additional position sensor 123 according to the conventional related art for the purpose of detecting a position of micromirror 122, which generates a position signal that may be, or is, used for plausibilizing measuring signal 61, for instance.

In FIG. 2, a first light detector 115, e.g., a photodiode, is developed and disposed at a left edge of opening 119 of diaphragm 113, and a second light detector 117, e.g., in the form of a photodiode, is developed and disposed on a right edge of opening 119. In general, the first and second light detectors 115, 117 may be situated parallel to each other, especially adjacent to one of the two reversal points or reversal zones of deflected beam of light 50 according to the periodic movement about fast axis of rotation 111. For instance, first and second light detectors 115, 117 may be developed in square form or, preferably, in the form of strips, a longitudinal axis of the respective strip being disposed parallel to fast axis of rotation 111 and thus perpendicular to the movement direction about fast axis of rotation 111. As a result, light detectors 115, 117 are then also set up for detecting beam of light 50 even if beam of light 50 is additionally rotated or tilted about a slow axis of rotation perpendicular to fast axis of rotation 111. First and second light detectors 115, 117 jointly form a detector unit 118, which is thus designed to periodically detect an impingement or the missing impingement of scanning beam of light 50 on detector device 118, and to generate a measuring signal 61 on the basis thereof, as schematically illustrated in FIG. 3.

Figure 3:
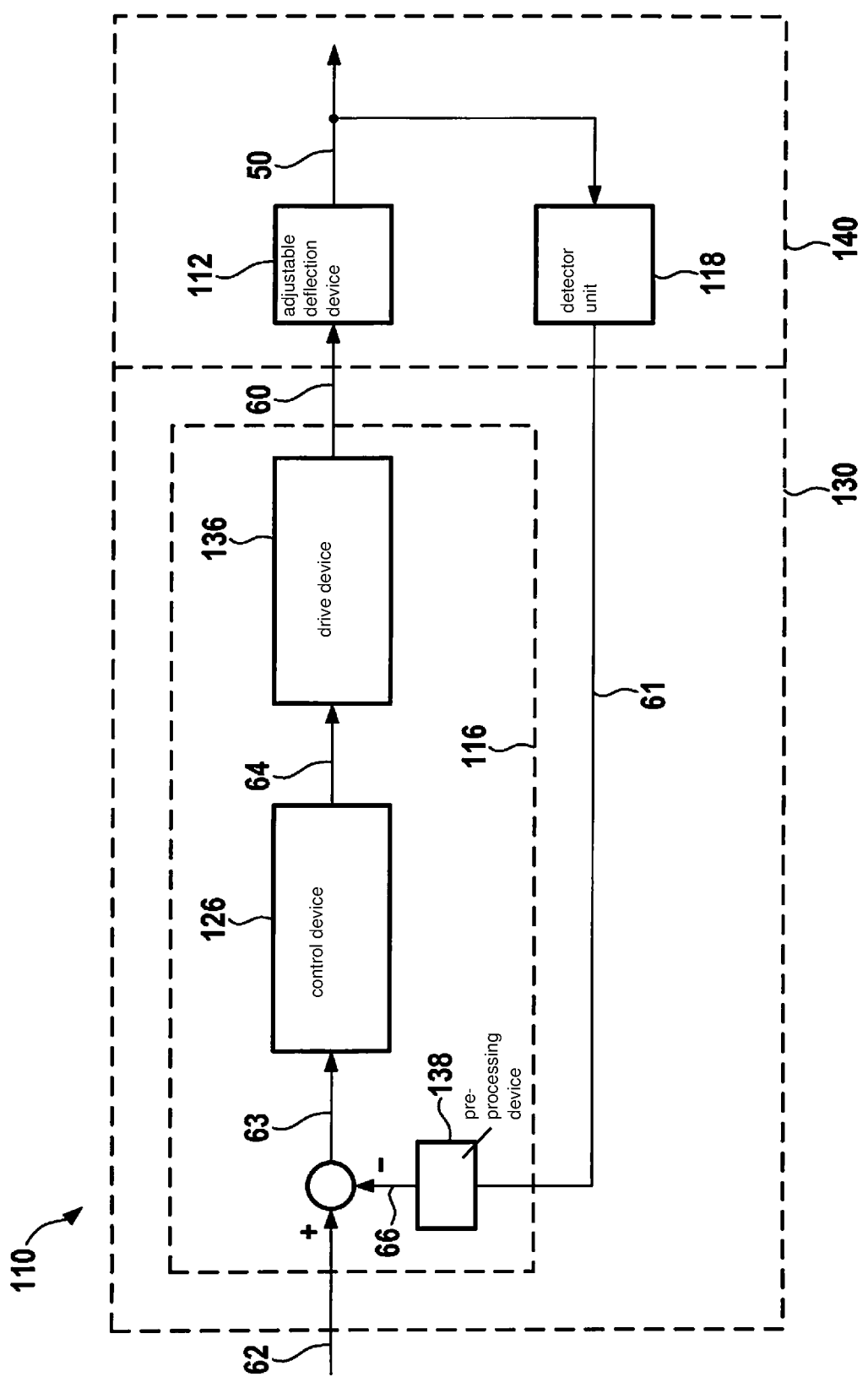
FIG. 3 shows a schematized block diagram of the device according to FIG. 2.

FIG. 3 shows a schematized block diagram of device 110. FIG. 3 shows that device 110 has a closed-loop control unit 116, which is designed to generate an actuating signal 60 by which deflection device 112 is controlled in order to scan solid angle region 115 or the object with the aid of beam of light 50 deflected by deflection device 112 in a periodic movement. To do so, actuating signal 60, e.g., an electrical voltage, is able to be transmitted to an actuator device of deflection device 112, which is designed to rotate micromirror 122 about axis of rotation 111. Closed-loop control unit 116 is developed to receive an external reference variable 62, which is modified, e.g., decreased, on the basis of generated measuring signal 61 in order to generate a modified reference variable 63. The measuring signal is preferably conditioned, i.e. processed, with the aid of a pre-processing device 138 of device 110 in order to generate a processed measuring signal 66, which is based on measuring signal 61 and on the basis of which external reference variable 63 is modified. A respective instantaneous value of processed measuring signal 66 may be indirectly or directly deducted from a respective instantaneous value of reference variable 62, for example, in order to generate a respective instantaneous value of modified reference variable 63.

Closed-loop control unit 116 may include a control device 126, which receives modified reference variable 63 and transmits a control signal 64 that is based thereon to a drive device 136 of closed-loop control unit 116, thus inducing it to output actuating signal 60, which is adapted on the basis of control signal 64. As schematically illustrated in FIG. 3, closed-loop control unit 116, control device 126, and drive device 136, for example, may be realized in an application-specific integrated circuit 140 (ASIC) of device 110. Deflection device 112 and detector device 118 may be developed as part of a micro-electromechanical system 140, MEMS, of device 110.

First and second light detectors 115, 117 output a measuring signal, or a shared measuring signal 61 in each case, which includes one bit. A logical zero means that no impingement of the beam of light on respective light detector 115, 117 was detected. A logical one means that the impingement of beam of light 50 on corresponding light detector 115, 117 was detected. The detection of the impingement or the missing impingement takes place at one of a multitude of measuring instants, especially regular, consecutive measuring instants, e.g., as schematically illustrated in FIG. 4 and described in the following text.

Deflection device 112 of device 110 is operated in a resonant manner. As illustrated with the aid of FIG. 2, each one of light detectors 115, 117 checks for the detection or non-detection of beam of light 50 once during each period of the periodic movement about fast axis of rotation 111. At each of the consecutive measuring instants, closed-loop control unit 116 determines whether an amplitude of the periodic movement about fast axis of rotation 111 is to be increased or decreased. Whenever a missing impingement of beam of light 50 on detector device 118 is detected, i.e., on first and second light detector 115, 117, at one of the measuring instants, the amplitude will be increased. Whenever an impingement of scanning beam of light 50 on detector device 118, in particular on first and second light detector 115, 117, is detected at one of the measuring instants, the amplitude will be decreased. The increasing or decreasing of the amplitude of the periodic movement may particularly be implemented by increasing or decreasing an amplitude of actuating signal 60.

Figure 4:
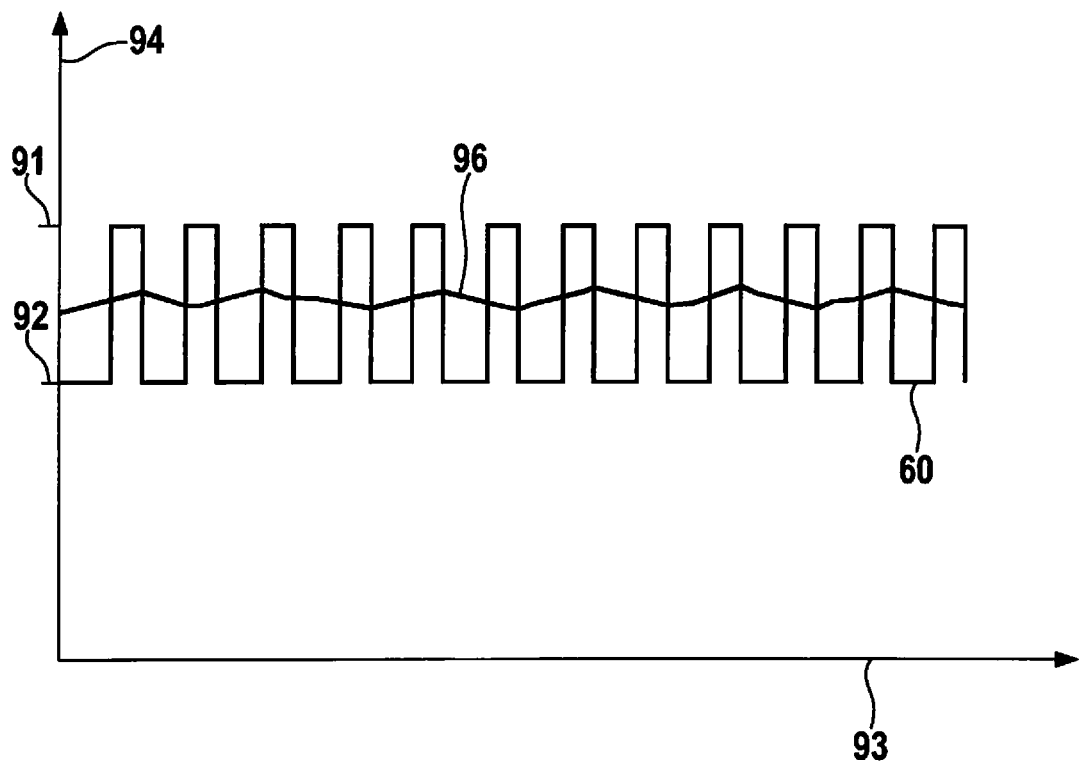
FIG. 4 shows a schematized graph to describe the method of functioning of the device according to FIG. 2 and FIG. 3.

FIG. 4 shows a schematic graph in order to explain the method of functioning of device 110. A horizontal axis 93 represents the time, and a vertical axis 94 represents an amplitude. The amplitude of actuating signal 60, which has a sinusoidal development, for instance, is switched back and forth between a first value 91 and a second value 92 that is lower than first value 91, for example. Whenever an impingement of beam of light 50 on detector device 118 is detected at a measuring instant, the amplitude of actuating signal 60 is set to second value 92. Whenever a missing impingement of beam of light 50 on detector device 118 is detected at a measuring instant, the amplitude of actuating signal 60 is set to first value 91. Amplitude 96 of deflection device 112, i.e., the deflection of micromirror 122, increases or decreases accordingly. As an alternative, the amplitude of actuating signal 60 may also have a plurality of steps or may be able to be steadily increased and decreased. The increasing and decreasing of amplitude 96 is shown in FIG. 4 merely by way of example. A first duration of the length of time that the amplitude of actuating signal 60 remains at first value 91 may differ from a second duration of the length of time that the amplitude of the actuating signal remains at second value 92 in each case. For example, the second duration may be more than five times, e.g., nine times, as long as the first duration.

The consecutive measuring instants are selected in such a way, for example, that the detecting of the impingement or non-impingement of the beam of light on detector unit 118 regularly takes place when beam of light 50 would exactly impinge on first or second light detector 115, 117 according to the periodic movement about fast axis of rotation 111 during a current operation or in an ideal operation of device 110. Alternatively, or equivalently therewith, the measuring instants may be selected such that in a current operation or in an ideal operation of device 110, they always coincide with a reversal of beam of light 50 in the movement according to fast axis of rotation 111.

Toggling of actuating signal 60, which is caused by the constant switch between increasing and decreasing the amplitude due to the change between detection and non-detection of scanning beam of light 50 by detector device 118, is advantageously produced in device 110. This toggling advantageously has a clearly smaller time constant than a time constant of deflection device 112. This achieves an amplitude that is adjustable in an especially precise manner and that is more precise the faster the toggling between detection and non-detection occurs. An especially small dead time in the return of measuring signal 61 to closed-loop control unit 116 as well as a high bandwidth of the closed-loop control unit 116 are advantageous for this purpose.

Conventional, resonance-operated micromirror systems are high-quality systems having time constants in the amplitude change of approximately 0.1 seconds. They also have a clearly higher resonant frequency in the kHz range, e.g., 20 kHz. As already described earlier in the text, this produces advantageous toggling, which is caused by the constant switch between detection and non-detection.

Figure 5:
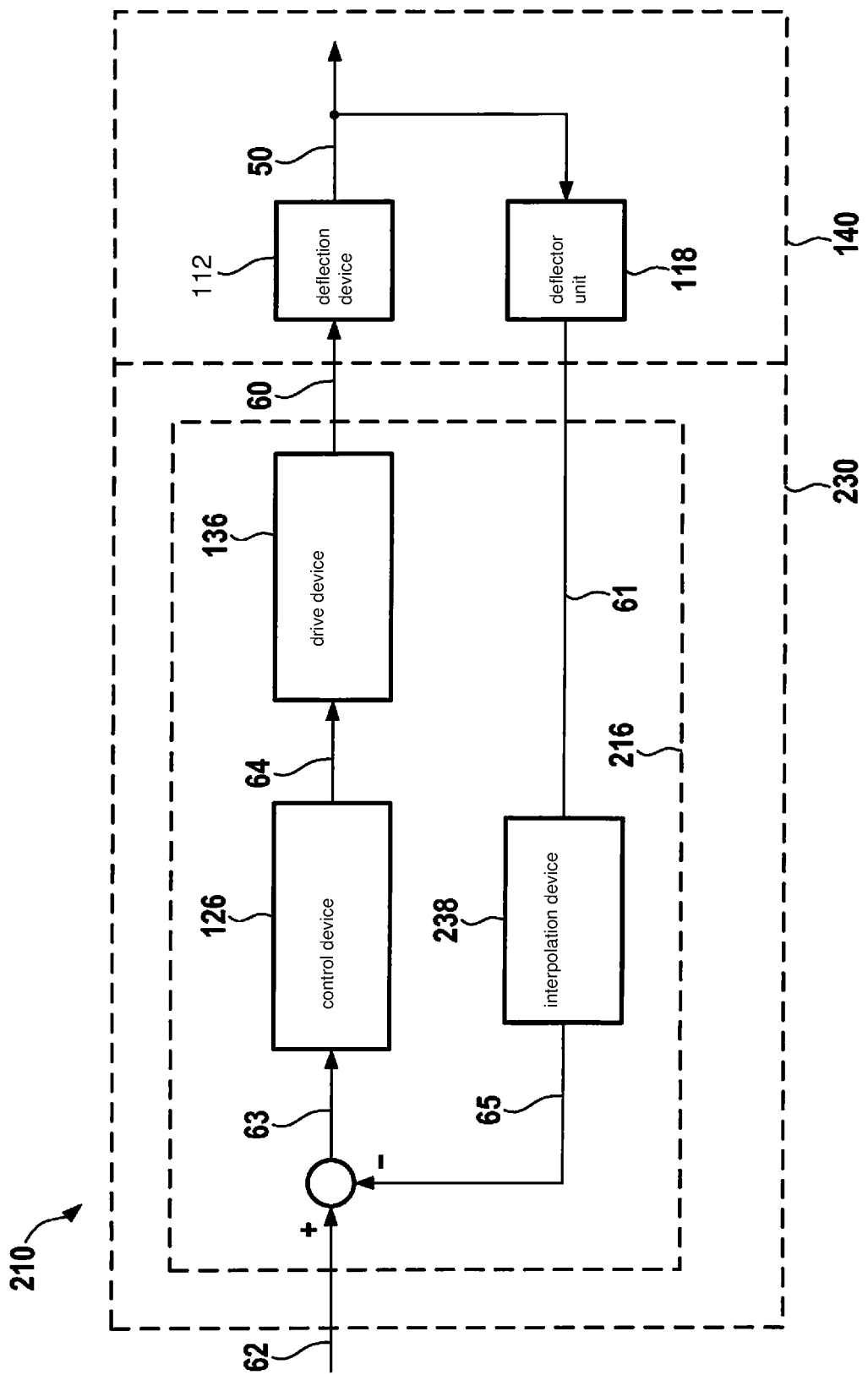
FIG. 5 shows a schematized block diagram of a device for deflecting a beam of light according to a still further specific embodiment of the present invention.

FIG. 5 shows a schematic block diagram of a device 210 for deflecting a beam of light 50 according to a still further specific embodiment of the present invention. Device 210 is a variant of device 110, which differs from it especially in the development of ASIC 230 of device 210 instead of ASIC 130 of device 110; more specifically, it differs in the development of closed-loop control unit 216 of device 210, and thus in the evaluation of the signals of MEMS 140, and may otherwise be similar to device 110. In addition, deflection device 112 of device 210 is operated in a quasi-static manner.

First light detector 115 of device 210 is designed to detect the impingement or the missing impingement of scanning beam of light 50 at a location that corresponds to a maximum positive deflection of deflection device 112, and to do so exactly once in each period of the periodic movement about fast axis of rotation 111 of the scanning of the solid angle region or object 115. Second light detector 117 of device 210 is designed to detect the impingement or the missing impingement of scanning beam of light 50 at a location that corresponds to a maximum negative deflection of deflection device 112, and to do so exactly once in each period of the periodic movement about the fast axis of rotation of the scanning of the solid angle region. First and second light detectors 115, 117 are disposed at a reversal point or a reversal zone of the periodic movement about fast axis of rotation 111 of the scanning, or in the vicinity of the respective reversal point or the reversal zone in each case.

Closed-loop control unit 216 of device 210 has an interpolation device 238, which is designed to detect a first value of reference variable 62 at the instant of the impinging of scanning beam of light 50 on first light detector 115 and to detect a second value of reference variable 62 at the instant of the impinging of scanning beam of light 50 on second light detector 117. In addition, interpolation device 238 is designed to interpolate further values of reference variable 62 between the detected first and second values of reference variable 62, in particular in connection with the instants of the impingement on first and/or second light detector 115, 117, and to make them available in an interpolation signal 65. Reference variable 62 is adapted, in particular recalibrated, by closed-loop control unit 216 on the basis of interpolation signal 65.

Figure 6:
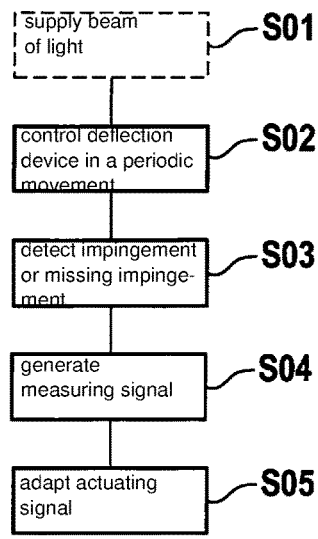
FIG. 6 shows a schematized flow diagram to describe a method for deflecting a beam of light according to a still further specific embodiment of the present invention.

FIG. 6 shows a schematized flow diagram in order to describe a method for deflecting a beam of light according to a still further specific embodiment of the present invention. The method according to FIG. 6 is able to be carried out with the aid of the device according to the present invention, in particular one of devices 10; 110; 210, and is adaptable accordingly with regard to all further developments and variants described with reference to the device according to the present invention, and vice versa.

In a step S02, a deflection device 12; 112 is controlled in a periodic movement by a control signal 60 for scanning a solid angle region 115 with the aid of a beam of light 50 that is deflected by deflection device 12; 112. In an optional step S01, beam of light 50 used for this purpose is able to be supplied, especially generated, by a supply device 14. In a step S03, an impingement or a missing impingement of scanning beam of light 50 on a detector device 18; 118 is detected, in particular periodically. In a step S04, a measuring signal 61 is generated based on a result of detection S03.

In a step S05, actuating signal 60 is adapted based on measuring signal 61. For example, as described with reference to device 110, measuring signal 61 may have one bit, and especially may be made up of one bit, which indicates an impingement or non-impingement of beam of light 50 on detector device 18; 118 in each case. An amplitude of deflection device 12; 112 may be increased whenever measuring signal 61 represents a logical zero, and be decreased whenever measuring signal 61 represents a logical one. As an alternative, as described with reference to device 210, values of reference variable 62 may be interpolated and used for the compensating adaptation of reference variable 62, e.g., with the aid of interpolation device 238 of device 210.

Although the present invention was described above with the aid of preferred exemplary embodiments, it is not restricted to such embodiments but may be modified in many ways. In particular, the present invention is able to be changed or modified in a variety of ways without departing from the core of the present invention.

What is claimed is:

1. A device for deflecting a beam of light, comprising:
an adjustable deflection device;
a closed-loop control unit to generate an actuating signal by which the deflection device is controlled in a periodic movement for scanning a solid angle region with a beam of light that the beam of light is deflected by the deflection device;
a detector device to detect an impingement or a missing impingement of the scanning beam of light on the detector device and to generate a measuring signal on the basis of the detection, and
an interpolation device;
wherein the closed-loop control unit is configured to adapt the actuating signal on the basis of at least the measuring signal, and
wherein the closed-loop control unit for generating the actuating signal is controllable by an external reference variable, and is configured to detect a first value of the reference variable when the scanning beam of light impinges on the first light detector, and to detect a second value of the reference variable when the scanning beam of light impinges on the second light detector, wherein the interpolation device is configured to interpolate further values of the reference variable between the detected first and second values of the reference variable, and wherein the reference variable for the control of the closed-loop control unit is adapted based on the interpolated further values of the reference variable.

2. The device as recited in claim 1, wherein the detector device is configured to detect the impingement or the missing impingement of the scanning beam of light on the detector device at least once in each period of a periodic movement about a fast axis of rotation of the scanning of the solid angle region.

3. The device as recited in claim 2, wherein the detector device has a first light detector and a second light detector, which are configured to detect the impingement or the missing impingement of the scanning beam of light on the first light detector and the second light detector at least once in each period of the periodic movement about the fast axis of rotation of the scanning of the solid angle region.

4. The device as recited in claim 1, wherein the deflection device is configured for a resonant operation, and the actuating signal, which is adapted based on the measuring signal, is developed so that an amplitude of the periodic movement is increased or decreased based on the measuring signal.

5. The device as recited in claim 4, wherein the closed-loop control unit is configured to increase or decrease an amplitude of the periodic movement at consecutive measuring instants with the adapted actuating signal, the amplitude being increased if the detector device detects a missing impingement of the scanning beam of light on the detector device, and the amplitude being decreased if the detector device detects an impingement of the scanning beam of light on the detector device.

6. The device as recited in claim 1, wherein the deflection device is configured for a quasi-static operation, and wherein the detector device has a first light detector and a second light detector, wherein the first light detector is configured to detect the impingement or the missing impingement of the scanning beam of light at a location that corresponds to a maximum positive deflection of the deflection device, and to do so once in each period of the periodic movement about a fast axis of rotation of the scanning of the solid angle region, and the second light detector is configured to detect the impingement or the missing impingement of the scanning beam of light at a location that corresponds to a maximum negative deflection of the deflection device, and to do so once in each period of the periodic movement about the fast axis of rotation of the scanning of the solid angle region.

7. A method for deflecting a beam of light, the method comprising:
   controlling a deflection device with a control signal for scanning a solid angle region with a beam of light, deflected by the deflection device, in a periodic movement;
   detecting an impingement or a missing impingement of the scanning beam of light on a detector device;
   generating a measuring signal based on a result of the detection; and
   adapting the actuating signal based on the measuring signal;
   wherein the control of the deflection device takes place as a function of an external reference variable, wherein a first value of the reference variable is detected when the scanning beam of light impinges on a first light detector, and a second value of the reference variable is detected when the scanning beam of light impinges on a second light detector, and wherein further values of the reference variable between the detected first and second values of the reference variable are interpolated, and the reference variable is adapted based on the interpolated further values of the reference variable.

8. The method as recited in claim 7, wherein an amplitude of the periodic movement of the deflection device is increased when the detector device detects a missing impingement of the scanning beam of light on the detector device at a multitude of consecutive measuring instants, and wherein the amplitude of the periodic movement of the periodic movement of the deflection device is decreased when the detector device detects an impingement of the scanning beam of light on the detector device at one of the multitude of consecutive measuring instants.

* * * * *